(12) United States Patent
Melville-Brown

(10) Patent No.: US 12,145,682 B2
(45) Date of Patent: Nov. 19, 2024

(54) VEHICLE WITH EXTENDABLE PARTS

(71) Applicant: Honda Motor Co., Ltd., Tokyo (JP)

(72) Inventor: Guy Melville-Brown, Palos Verdes Estates, CA (US)

(73) Assignee: Honda Motor Co., Ltd., Tokyo (JP)

(*) Notice: Subject to any disclaimer, the term of this patent is extended or adjusted under 35 U.S.C. 154(b) by 720 days.

(21) Appl. No.: 17/470,600

(22) Filed: Sep. 9, 2021

(65) Prior Publication Data
US 2023/0074100 A1 Mar. 9, 2023

(51) Int. Cl.
| | | |
|---|---|---|
| *B62K 15/00* | (2006.01) | |
| *B62J 1/08* | (2006.01) | |
| *B62J 25/06* | (2020.01) | |
| *B62J 43/20* | (2020.01) | |
| *B62J 45/20* | (2020.01) | |
| *B62J 45/415* | (2020.01) | |
| *B62J 50/22* | (2020.01) | |
| *B62K 3/02* | (2006.01) | |
| *B62M 1/36* | (2013.01) | |
| *B62M 3/16* | (2006.01) | |
| *B62M 17/00* | (2006.01) | |
| *B62M 23/00* | (2006.01) | |

(52) U.S. Cl.
CPC ............ *B62K 15/00* (2013.01); *B62J 1/08* (2013.01); *B62J 25/06* (2020.02); *B62J 43/20* (2020.02); *B62J 45/20* (2020.02); *B62J 45/415* (2020.02); *B62J 50/22* (2020.02); *B62K 3/02* (2013.01); *B62M 1/36* (2013.01); *B62M 3/16* (2013.01); *B62M 17/00* (2013.01); *B62M 23/00* (2013.01)

(58) Field of Classification Search
CPC ..................................................... B62M 17/00
See application file for complete search history.

(56) References Cited

U.S. PATENT DOCUMENTS

| | | | |
|---|---|---|---|
| 2,501,217 A | 3/1950 | Hawn | |
| 3,863,503 A | 2/1975 | Loeb et al. | |
| 5,409,262 A * | 4/1995 | McLennan | B60N 2/42781 |
| | | | 296/187.05 |

(Continued)

FOREIGN PATENT DOCUMENTS

| | | |
|---|---|---|
| CN | 201046742 Y | 4/2008 |
| CN | 201405995 Y | 2/2010 |

(Continued)

*Primary Examiner* — Kevin Hurley
(74) *Attorney, Agent, or Firm* — Aaron Fong; American Honda Motor Co., Inc.

(57) ABSTRACT

A vehicle includes a body having a first part and a second part, which is moveably coupled to the first part. The vehicle further includes a pedal assembly having a first component coupled to the first part and a wheel assembly having a second component coupled to the second part. The vehicle further includes an extendable drive shaft having a first member and a second member. The first member is coupled to the first component and the second member is coupled to the second component. The vehicle further includes a locking mechanism having a locking member coupled to the first part and the second part of the body. The locking member, in an unlocked position, unlocks the second part from the first part to allow the second part to move over the first part, which may cause a change in a length of the extendable drive shaft.

19 Claims, 9 Drawing Sheets

(56) References Cited

U.S. PATENT DOCUMENTS

| | | | |
|---|---|---|---|
| 7,192,038 B2 | 3/2007 | Tsai | |
| 7,434,489 B1 | 10/2008 | Scranton | |
| 11,214,329 B2 * | 1/2022 | Lu | ............ B62K 5/06 |
| 11,352,092 B2 * | 6/2022 | Froidevaux | ............ B62K 11/04 |
| 2004/0083839 A1 | 5/2004 | Hahn | |
| 2010/0081511 A1 * | 4/2010 | Lobel | ............ F16D 3/223 |
| | | | 464/140 |
| 2013/0240274 A1 * | 9/2013 | Vitale | ............ B62D 63/025 |
| | | | 180/65.1 |
| 2018/0229795 A1 * | 8/2018 | Thomson | ............ B62K 3/005 |
| 2021/0079987 A1 | 3/2021 | Cooper | |

FOREIGN PATENT DOCUMENTS

| | | | |
|---|---|---|---|
| CN | 204161568 U | 2/2015 | |
| CN | 209553404 U | 10/2019 | |
| CN | 110435805 A | 11/2019 | |
| CN | 111038642 A | 4/2020 | |
| CN | 110126964 B | 10/2020 | |
| CN | 109649564 B | 11/2020 | |
| DE | 10063539 A1 | 4/2002 | |
| DE | 102009020037 A1 * | 11/2009 | ............ B60K 17/22 |
| GB | 2251586 B | 8/1995 | |
| JP | H07266906 A | 10/1995 | |
| KR | 970042423 U | 7/1997 | |
| KR | 101614437 B1 | 4/2016 | |

\* cited by examiner

500

Dispose vehicle that includes body having first part, second part, and extendable drive shaft moveably coupled between first part and second part of body 502

Move locking member in unlocked position to unlock second part from first part, wherein locking member is coupled to first part and second part of body 504

Allow, in unlocked position, second part to move over first part, wherein movement of second part causes change in length of extendable drive shaft 506

FIG. 5

VEHICLE WITH EXTENDABLE PARTS

BACKGROUND

Advancements in personal transportation, especially in micro-mobility, have paved a way to a wide adoption of vehicles, such as e-bikes, hoverboards, and electric scooters for short distance travel. These may be especially useful for last mile transportation. A vehicle, such as an electric bike typically includes a seating arrangement (such as a single saddle) to accommodate an occupant and some additional space for cargo at the back, front, or one of the sides of the vehicle. In some instances, a rider may want to have more occupant space for people in the vehicle along with a space for some cargo. Many vehicles for personal transportation, especially for micro-mobility, still lack features required to accommodate multiple people and cargo.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a vehicle. The vehicle may include a body having a first part and a second part. The second part may be moveably coupled to the first part. The vehicle may further include a pedal assembly that may include a first component, which may be coupled to the first part. The vehicle may further include a wheel assembly that may include a second component, which may be coupled to the second part. The vehicle may further include an extendable drive shaft that may include a first member and a second member. The first member may be coupled to the first component and the second member may be coupled to the second component. The vehicle may further include a locking mechanism that may include a locking member, which may be coupled to the first part and the second part of the body. The locking member, in an unlocked position, may unlock the second part from the first part, which may allow the second part to move over the first part. The movement of the second part may cause a change in a length of the extendable drive shaft.

Another exemplary aspect of the disclosure provides a vehicle. The vehicle may include a body having a first part and a second part. The second part may be moveably coupled to the first part. The vehicle may further include a saddle which may vertically extend from the first part of the body in a direction which may be substantially perpendicular to a first direction of the vehicle. The vehicle may further include a pedal assembly that may include a first component, which may be coupled to the first part. The vehicle may further include a wheel assembly that may include a second component, which may be coupled to the second part. The vehicle may further include an extendable drive shaft that may include a first member and a second member. The first member may be coupled to the first component and the second member may be coupled to the second component. The vehicle may further include a locking mechanism that may include a locking member, which may be coupled to the first part and the second part of the body.

Another exemplary aspect of the disclosure provides a method of operating a vehicle. The method comprises disposing a vehicle. The vehicle may include a body that may include a first part and a second part moveably coupled to the first part. The vehicle may further include a pedal assembly that may include a first component coupled to the first part and a wheel assembly that may include a second component coupled to the second part. The vehicle may further include an extendable drive shaft that may include a first member and a second member. The first member may be coupled to the first component and the second member may be coupled to the second component. The vehicle may further include a locking mechanism that may include a locking member, which may be coupled to the first part and the second part of the body. The method may include moving the locking member in an unlocked position to unlock the second part from the first part and allowing, in the unlocked position, the second part to move over the first part. The movement of the second part may cause a change in a length of the extendable drive shaft.

This summary is provided to introduce a selection of concepts in a simplified form that is further disclosed in the detailed description of the present disclosure. This summary is not intended to identify key or essential inventive concepts of the claimed subject matter, nor is it intended for determining the scope of the claimed subject matter.

BRIEF DESCRIPTION OF THE DRAWINGS

FIG. 5 is a flowchart that illustrates an exemplary method to operate the vehicle of FIG. 1, in accordance with an embodiment of the disclosure.

Figure 1:
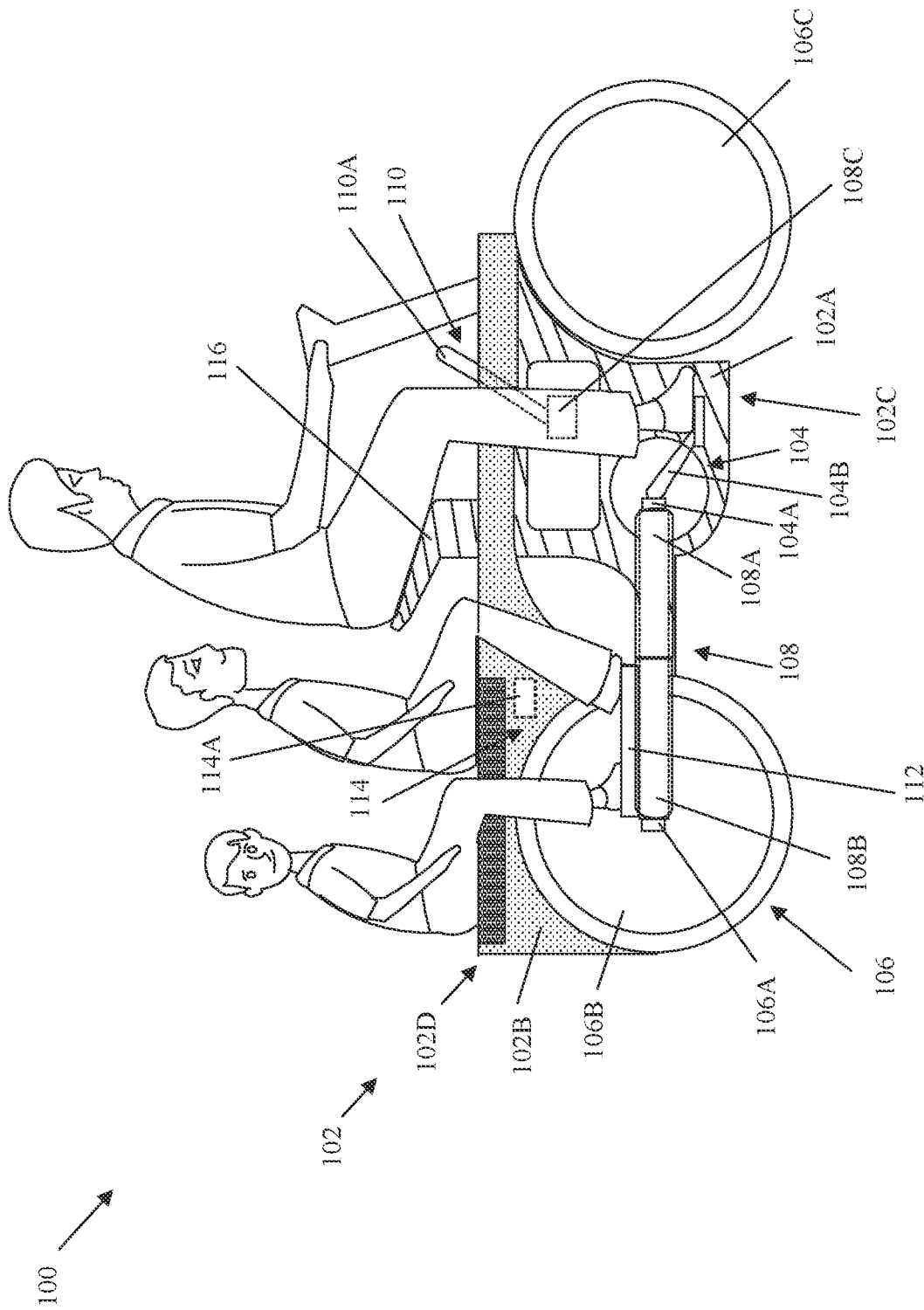
FIG. 1 is a diagram that illustrates an exemplary vehicle, in accordance with an embodiment of the disclosure.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide a vehicle (such as an electric bike). The vehicle may include a body having a first part and a second part moveably coupled to the first part. The second part may be moveably (or slidably) coupled to the first part to allow the body to extend (or contract) according to a requirement of additional seating space and cargo space in the vehicle. For example, the second part may extend from the first part to expose a concealed space and to increase an availability of the space for several occupants and/or cargo. In order to conceal such space, the second part may retract towards the first part to conceal the exposed space.

The vehicle may further include an extendable drive shaft, which may be configured to change its length based on a movement of the second part from the first part of the body. The change in length of the extendable drive shaft may control a speed and/or a torque of the vehicle based on a state of the vehicle, which may further improve a riding experience. For example, based on whether the vehicle is moving uphill or downhill, the extendable drive shaft may be configured to change its length to improve the speed and/or the torque of the vehicle. Similarly, based on whether the vehicle is occupied with a single occupant/cargo or several occupants/cargo, the extendable drive shaft may be configured to change its length to improve the speed and/or the torque of the vehicle. By having the extendable drive shaft and a moveable second part of the body, the rider may find it easier to extend and contract the space for occupants and cargo.

The vehicle may further include a locking mechanism that includes a locking member coupled to the first part and the second part of the body. The locking member, in an unlocked position, may unlock the second part from the first part, which may allow the second part to move over the first part. The movement of the second part may cause a change in a length of the vehicle. The change in the length of the vehicle may modify a torque of the vehicle based on a state (such as a loaded state) of the vehicle and may improve a maneuverability of the vehicle based on the modified torque, which may further improve the riding experience of the occupant.

FIG. 1 is a diagram that illustrates an exemplary vehicle, in accordance with an embodiment of the disclosure. With reference to FIG. 1, there is shown a vehicle 100. The vehicle 100 may have provisions to be a non-autonomous vehicle, a semi-autonomous vehicle, or a fully autonomous vehicle, for example, as defined by Society of Automotive Engineers (SAE). The vehicle 100 may use one or more distinct renewable or non-renewable power sources, such as, but not limited to, a solar-powered source, a battery-based electric power source, a fossil fuel-based power source (such as diesel or petrol), a hydrogen fuel-based power source, or a fuel cell-based power source.

The vehicle 100 may include a body 102 having a first part 102A and a second part 102B, a pedal assembly 104 including a first component 104A that may be coupled to the first part 102A, a wheel assembly 106 including a second component 106A that may be coupled to the second part 102B, an extendable drive shaft 108 including a first member 108A coupled to the first component 104A and a second member 108B coupled to the second component 106A, and a locking mechanism 110 coupled to the first part 102A and the second part 102B of the body 102. In an embodiment, the vehicle 100 may further include a footrest dock 112, a footrest adjustment mechanism 114, and a saddle 116.

The body 102 may be configured to hold components, such as the pedal assembly 104, the wheel assembly 106, the extendable drive shaft 108, the locking mechanism 110, a footrest dock 112, a footrest adjustment mechanism 114, and a saddle 116 of the vehicle 100. For example, the body 102 may include a plurality of component spaces (such as a section or a compartment) to accommodate several components of the vehicle 100 in the plurality of component spaces. The body 102 having a two-part structure (i.e. the first part 102A and the second part 102B) in FIG. 1 is merely shown as an example and should not be construed as limiting the disclosure. In some embodiments, the body 102 may have more than two parts (for example, a three-part structure, a four-part structure, and the like) and may be configured to accommodate more than one occupant and/or cargo, without departing from the scope of the disclosure.

The first part 102A may be an enclosure that includes a first component space 102C to hold a battery (not shown) and the pedal assembly 104 of the vehicle 100. The first part 102A may further include a suitable interface (such as a slot in the first part 102A) to hold certain component of the vehicle 100. For example, the first part 102A may include a first interface (not shown) that may be configured to hold components of the locking mechanism 110. In another example, the first part 102A may include a second interface (not shown) that may be configured to hold the saddle 116 of the vehicle 100. In yet another example, the first part 102A may include a third interface (not shown) that may be configured to hold other components such as a steering handle and a brake of the vehicle 100. In an embodiment, the first interface, the second interface, and the third interface of the first part 102A may be linearly located on the first part 102A so that it is easier for the occupant to access the components of the vehicle 100.

In an embodiment, the first part 102A may be a frame of the vehicle 100, which may be located on a first side (such as a front side) of the vehicle 100. The first part 102A may be statically disposed on the first side of the vehicle 100. For example, the first part 102A may be configured to be immovably coupled to the first side of the vehicle 100. If the first part 102A encloses heavier components (such as the battery) of the vehicle 100, then the first part 102A may be statically disposed on the first side of the vehicle 100 to minimize any wobble in the vehicle 100. In an embodiment, the second part 102B may be slidably or telescopically coupled with first part 102A.

The second part 102B may be an enclosure that may include a second component space 102D to hold the wheel assembly 106. The second part 102B may further include a suitable portion (such as a protrusion/slot in the second part 102B) to hold certain component of the vehicle 100. For example, the second part 102B may include a first portion (not shown) that may be configured to hold the footrest dock 112 of the vehicle 100. The second part 102B may also include a second portion (not shown) that may be configured to hold components of the footrest adjustment mechanism 114 of the vehicle 100. The second part 102B may also include a third portion (not shown) that may be configured to hold other components such as a rear seat of the vehicle 100. In an embodiment, the first portion, the second portion, and the third portion of the second part 102B may be linearly located in the second part 102B so that it is easier for the occupant to access the components of the vehicle 100.

In an embodiment, the second part 102B may be an extendable cargo portion that may rest on the frame (such as the first part 102A) of the vehicle 100. In another embodiment, the second part 102B may be an extendable seating portion that may rest on the frame (such as the first part 102A) of the vehicle 100. For example, the second part 102B may be a frame of the vehicle 100 and may be located on a second side (such as a rear side) of the vehicle 100. The second part 102B may be configured to extend from the first part 102A of the vehicle 100. In an embodiment, the second part 102B may be moveably (such as slidably or telescopically) coupled to the first part 102A of the vehicle 100. As the second part 102B is moveably coupled on the first part 102A, the second part 102B may enclose only light weight components (such as the wheel assembly 106). This may help to quickly slide the second part 102B over the first part 102A or to telescopically extend the second part 102B from the first part 102A. In an embodiment, the components (such as the wheel assembly 106) of the second part 102B may be telescopically extended from the components (such as the pedal assembly 104) of the first part 102A, to accommodate more occupants and/or cargo on the vehicle 100.

The pedal assembly 104 may be configured to transmit torque from a pedal to the wheel assembly 106 via the extendable drive shaft 108. In an embodiment, the pedal assembly 104 may include a first component 104A and a crank 104B. The first component 104A may be coupled to the first part 102A of the body 102. For example, the first component 104A may be a bevel gear that may be disposed in the first component space 102C of the first part 102A of the body 102. In an embodiment, the crank 104B may be configured to receive a torque and to transmit the received torque to the extendable drive shaft 108, via the first component 104A. For example, the crank 104B may receive the torque based on a pedaling movement (such as, an application of force on a pedal associated with the crank 104B to rotate the pedal) of a rider of the vehicle 100 and may transmit the received torque to the extendable drive shaft 108, via the first component 104A. In an embodiment, the pedal assembly 104 may be disposed in a plane that may be parallel to a plane of a leg profile of the rider of the vehicle 100 so that it may be easier for the rider to drive the vehicle 100. In another embodiment, the pedal assembly 104 may be disposed in a plane, which may be adjustable in accordance with a plane of a leg profile of the rider of the vehicle 100 so that it may be easier for the pedal assembly 104 to receive the torque and transmit the received torque to the wheel assembly 106.

The wheel assembly 106 may be configured to transmit the received torque to at least one wheel of the vehicle 100. In an embodiment, the wheel assembly 106 may include a second component 106A, a rear wheel 106B, and a front wheel 106C. The second component 106A may be coupled to the second part 102B of the body 102. For example, the second component 106A may be a bevel gear that may be disposed in the second component space 102D of the second part 102B of the body 102. In an embodiment, the rear wheel 106B may be configured to move the vehicle 100 based on received torque via the second component 106A. Based on the movement of the second part 102B of the body, the rear wheel 106B of the wheel assembly 106 may be configured to move away from the front wheel 106C. The movement of the rear wheel 106B may eventually adjust a wheelbase (i.e. a distance between the rear wheel 106B and the front wheel 106C) of the vehicle 100. Such adjustment of the wheelbase of the vehicle 100 may improve a stability of the vehicle 100. In an embodiment, the adjustment of the wheelbase may also cause a change in a length of the extendable drive shaft 108, which may further improve the stability of the vehicle 100.

The extendable drive shaft 108 may include a first member 108A and a second member 108B. The first member 108A may be coupled to the first component 104A and the second member 108B may be coupled to the second component 106A. For example, the first member 108A may be coupled to the bevel gear of the pedal assembly 104 and the second member 108B may be coupled to the bevel gear of the wheel assembly 106. The extendable drive shaft 108 may be disposed between the pedal assembly 104 and the wheel assembly 106 to receive the torque from the wheel assembly 106 and to transmit the received torque to the pedal assembly 104. In an embodiment, the extendable drive shaft 108 may moveably couple the second part 102B (that may be located on the second side of the vehicle 100) with the first part 102A (that may be located on the first side of the vehicle 100). Based on the movement of the second part 102B, there may be a change in the length of the extendable drive shaft 108. The change in the length may correspond to an extension or a contraction of the second member 108B telescopically from the first member 108A.

The first member 108A may be a cylindrical shaft that may be coupled to the first component 104A of the pedal assembly 104 that may be disposed in the first component space 102C of the first part 102A. The first member 108A may include a suitable interface (such as a spring, a clasp, or a latch) to releasably couple the second member 108B of the extendable drive shaft 108 with the first member 108A. For example, the first member 108A may include a resilient spring lock (not shown), which may be coupled with the locking mechanism 110 to releasably couple the second member 108B of the extendable drive shaft 108 with the first member 108A. In another example, the first member 108A may include a magnetic latch (not shown), which may be coupled with the locking mechanism 110 to releasably couple the second member 108B of the extendable drive shaft 108 with the first member 108A. Such an interface of the first member 108A may rigidly couple the second member 108B of the extendable drive shaft 108 to minimize any wobble between the first member 108A and the second member 108B, which may further improve the stability of the vehicle 100.

The second member 108B may be a cylindrical shaft that may be coupled to the second component 106A of the pedal assembly 104. The pedal assembly 104 may be disposed in the second component space 102D of the second part 102B. The second member 108B may include a suitable interface (such as a spring, a clasp, or a latch) to releasably couple the first member 108A of the extendable drive shaft 108 with the second member 108B. For example, the second member 108B may include a resilient spring lock (not shown), which may be coupled with the locking mechanism 110 to releasably couple the second member 108B of the extendable drive shaft 108 with the first member 108A. In another example, the second member 108B may include a magnetic latch (not shown), which may be coupled with the locking mechanism 110 to releasably couple the first member 108A of the extendable drive shaft 108 with the second member 108B. Such suitable interface of the second member 108B may firmly couple the second member 108B with the first member 108A of the extendable drive shaft 108 to minimize any wobble between the first member 108A and the second member 108B, which may further improve the stability of the vehicle 100.

In an embodiment, the vehicle 100 may further include a first actuator 108C that may be coupled to the extendable drive shaft 108. The first actuator 108C may be configured to apply a force on the extendable drive shaft 108 to cause a change in the length of the extendable drive shaft 108. The change in the length may further cause the second part 102B to move over the first part 102A. In an embodiment, the first actuator 108C may be a motor (such as a stepper motor), which may apply the force on the extendable drive shaft 108 to move the second member 108B with reference to the first member 108A. In an example, the first actuator 108C may apply the force on the extendable drive shaft 108 to move the second member 108B away from the first member 108A. In another example, the first actuator 108C may apply the force on the extendable drive shaft 108 to move the second member 108B towards the first member 108A. Such movement of the second member 108B may cause a change in the length of the extendable drive shaft 108, which may further cause the second part 102B to move over the first part 102A.

In another embodiment, the first actuator 108C may include a mechanical implement (such as a telescopic screw between the first member 108A and the second member 108B), which may apply the force on the extendable drive shaft 108 to move the second member 108B away from the first member 108A or towards the first member 108A. The movement of the second member 108B may cause a change in the length of the extendable drive shaft 108, which may further cause the second part 102B to move over the first part 102A.

In another embodiment, the first actuator 108C may include a pneumatic implement (such as a pneumatic pump), which may apply the force on the extendable drive shaft 108 to move the second member 108B away from the first member 108A or towards the first member 108A. The movement of the second member 108B may cause a change in the length of the extendable drive shaft 108, which may further cause the second part 102B to move over the first part 102A.

In another embodiment, the first actuator 108C may include a hydraulic implement (such as a hydraulic pump), which may apply the force on the extendable drive shaft 108 to move the second member 108B away from the first member 108A or towards the first member 108A. The movement of the second member 108B may cause a change in the length of the extendable drive shaft 108, which may further cause the second part 102B to move over the first part 102A. Based on the application of the force by the first actuator 108C on the second member 108B of the extendable drive shaft 108, the second member 108B may rapidly move from the first member 108A. The rapid movement of the second member 108B may cause a rapid change in the length of the extendable drive shaft 108, which may further cause the second part 102B to quickly move over the first part 102A. In another embodiment, the locking mechanism 110 may control a movement of the second member 108B away from the first member 108A or towards the first member 108A.

The locking mechanism 110 may include a locking member 110A that may be coupled to the first part 102A and the second part 102B of the body 102. The locking member 110A may be configured to releasably lock the movement of the second part 102B away from the first part 102A or towards the first part 102A. In an embodiment, the locking member 110A may include a suitable interface (such as a spring, a lever, or a latch) to releasably couple the second part 102B of the extendable drive shaft 108 with the first part 102A. For example, the locking member 110A may include a lever that may be coupled between the first part 102A and the second part 102B, to releasably lock the second part 102B with the first part 102A.

In an embodiment, the locking member 110A may be configured to integrally couple to the first part 102A. The locking member 110A may be further configured to releasably couple the second part 102B with the first part 102A. For example, in an unlocked position (as shown in FIG. 2B), the locking member 110A may unlock the second part 102B from the first part 102A, which may allow the second part 102B to move over the first part 102A. In a locked position, the locking member 110A may lock the second part 102B to the first part 102A.

In an embodiment, the locking member 110A may be located adjacent to a hand portion (not shown) of the rider or the occupant so that it is easier for the rider to trigger the locking member 110A and control the movement of the second part 102B from the first part 102A. In another embodiment, at least a portion of the locking member 110A may protrude from the first part 102A of the body 102. It may be easier for the occupant or the rider to access the locking member 110A and control the movement of the second part 102B away from the first part 102A or towards the first parts 102A.

The locking mechanism 110 may further include a biasing element (not shown) to retractably couple the second part 102B with the first part 102A. In an embodiment, based on the movement of the locking member 110A, the biasing element may be configured to retractably couple the second part 102B with the first part 102A. The biasing element may be, for example, a resilient spring which may be coupled between the first part 102A and the second part 102B. Based on the movement of the locking member 110A, the resilient spring may expand/compress to retractably couple the second part 102B with the first part 102A. As another example, the biasing element may include a geared connection (such as a rack and pinion arrangement), which may be coupled between the first part 102A and the second part 102B. Based on the movement of the locking member 110A, at least one pinion of the geared connection may retractably move on at least one rack of the geared connection to retractably couple the second part 102B with the first part 102A. As another example, the biasing element may include a pneumatic connection (such as a pneumatic pump), which may be coupled between the first part 102A and the second part 102B. Based on the movement of the locking member 110A, at least one valve (such as a pneumatic shuttle valve) may control the pneumatic pump associated with the pneumatic connection to retractably couple the second part 102B with the first part 102A.

Figure 3:
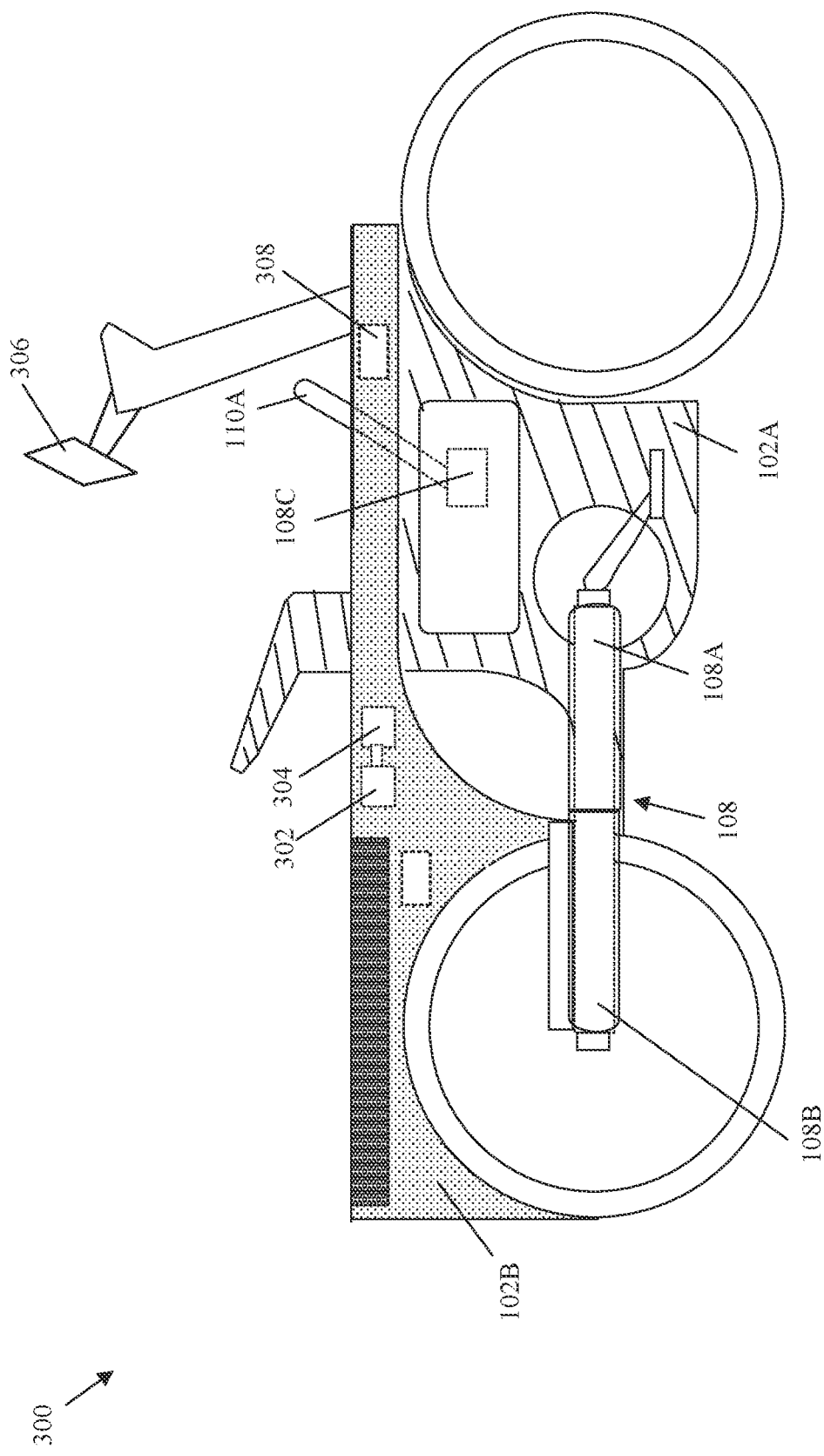
FIG. 3 is a diagram that illustrates an electronically-controlled exemplary vehicle, in accordance with an embodiment of the disclosure.

As another example, the biasing element may include a hydraulic connection (such as a hydraulic pump), which may be coupled between the first part 102A and the second part 102B. Based on the movement of the locking member 110A, at least one valve (such as a hydraulic shuttle valve) may control the hydraulic pump associated with the hydraulic connection to retractably couple the second part 102B with the first part 102A. As another example, the biasing element may include an electronic trigger unit (as shown in FIG. 3), which may be coupled between the first part 102A and the second part 102B. Based on the movement of the locking member 110A, the electronic trigger unit may be configured to control the movement of the second part 102B, to retractably couple the second part 102B with the first part 102A. Examples of the electronic trigger unit may include, but are not limited to, an electromagnetic latch and a solenoid. Details of the electronic trigger unit are further described, for example, in FIG. 3. In an embodiment, the movement of the second part 102B away from or towards the first part 102A may cause the footrest dock 112 to move away from or towards the first part 102A.

The footrest dock 112 may be coupled to the second part 102B of the body 102 and may be configured to accommodate a foot portion of the occupant in the vehicle 100. In an embodiment, the footrest dock 112 may be located on a base (not shown) of the vehicle, such that the plane of the footrest dock 112 matches with a plane of the foot portion of the occupant in the vehicle 100. In certain cases, the plane of the footrest dock 112 may not match with the plane of the foot portion of the occupant. For example, in case the occupant is a child, the plane of the footrest dock 112 may be adjusted to match the child foot portion of the child person. In an embodiment, the footrest dock 112 may be adjusted via the footrest adjustment mechanism 114.

The footrest adjustment mechanism 114 may include a second actuator 114A that may be coupled to the footrest dock 112 and may be configured to adjust a position of the footrest dock with respect to the base of the vehicle 100, based on occupant/rider requirements. In an embodiment, the second actuator 114A may be configured to apply a force on the footrest dock 112. The application of the force may cause a change in the position of the footrest dock 112 to match the foot portion of the occupant. For example, the second actuator 114A may be a motor (such as a stepper motor), which may apply the force on the footrest dock 112. As another example, the second actuator may include a mechanical implement (such as a screw jack), which may apply the force on the footrest dock 112. The application of the force may cause a change in the position of the footrest dock 112 so as to match a position of the foot portion of the occupant. As another example, the second actuator may include a pneumatic implement (such as a pneumatic pump), which may apply the force on the footrest dock 112. The application of the force may cause a change in the position of the footrest dock 112 so as to match a position of foot portion of the occupant. As another example, the second actuator may include a hydraulic implement (such as a hydraulic pump), which may apply the force on the footrest dock 112. The application of the force may cause a change in the position of the footrest dock 112 so as to match a position of the foot portion of the occupant. In an embodiment, instead of adjusting the footrest dock 112, the occupant may adjust the saddle 116. This may be performed so that the plane of the foot portion of the occupant matches with the plane of the footrest dock 112.

The saddle 116 may be configured to vertically extend from the first part 102A of the body 102 in a direction (as shown in FIG. 2B), which may be substantially perpendicular to a first direction (as shown in FIG. 2B) of the vehicle 100. In an embodiment, the vehicle 100 may further include a third actuator (not shown) that may be configured to vertically extend the saddle 116 from the first part 102A of the body 102. Examples of the third actuator may include, but not limited to, a motor (such as a stepper motor). a mechanical implement (such as a screw jack), a pneumatic implement (such as a pneumatic pump), or a hydraulic implement (such as a hydraulic pump). In case the occupant is a child, the plane of the saddle 116 may be adjusted to match a foot portion of the child with the plane of the footrest dock 112.

In operation, the locking member 110A may be set to be in the unlocked position. For example, the occupant (such as a driver of the vehicle 100) may hold the locking member 110A and may trigger the locking member 110A to the unlocked position. In the unlocked position, the locking member 110A may unlock the second part 102B from the first part 102A, which may allow the second part 102B to move over the first part 102A. The movement of the second part 102B may cause the change in the length of the extendable drive shaft 108. For example, the second member 108B of the extendable drive shaft 108 may be coupled to the second component 106A of the wheel assembly 106 that may be located in the second part 102B. When the second part 102B moves over the first part 102A, the second member 108B of the extendable drive shaft 108 may also move along with the second part 102B, causing a change in the length of the extendable drive shaft 108.

In an embodiment, the change in the length of the extendable drive shaft 108 and the movement of the second part 102B over the first part 102A may result in the change in the length of the vehicle 100 in the first direction (as shown in FIG. 2B). In an example, the first actuator 108C may be controlled to apply the force on the extendable drive shaft 108. Specifically, the first actuator 108C may apply the force on the second member 108B of the extendable drive shaft 108. The application of the force may cause the change in the length of the extendable drive shaft 108. For example, based on the application of the force on the second member 108B of the extendable drive shaft 108, the second member 108B may move away from or towards the first member 108A of the extendable drive shaft 108, causing a change in the length of the extendable drive shaft 108. The change in the length of the extendable drive shaft 108 may further cause the second part 102B to move over the first part 102A. For example, as the second member 108B of the extendable drive shaft 108 may be integrally coupled with the second component 106A (disposed in the second part 102B of the vehicle 100), the movement of the second member 108B may also move the second part 102B, causing the second part 102B to move over the first part 102A. The movement of the second part 102B over the first part 102A may cause the change in the length of the vehicle 100 in the first direction (as shown in FIG. 2B). As another example, when the biasing element of the locking mechanism 110 is triggered to apply the force on the second part 102B of the body 102, the second part 102B may move over the first part 102A and the movement of the second part 102B may result in the change in the length of the vehicle 100 in the first direction (as shown in FIG. 2B). Details of the change in the length of the vehicle 100, are further described, for example in FIGS. 2A-2D.

Figure 2A:
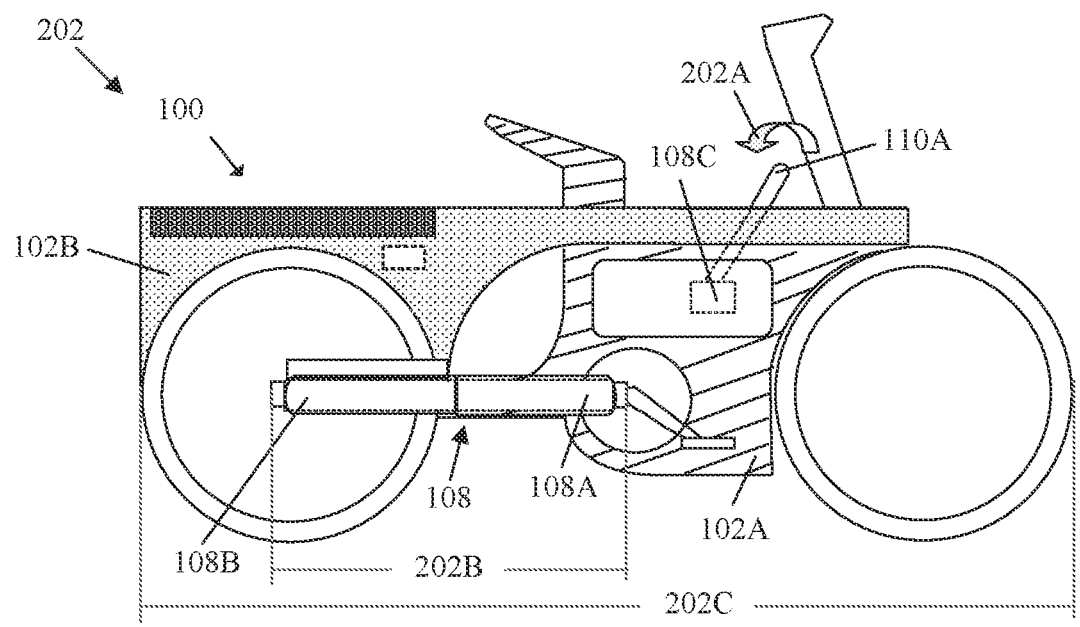
FIGS. 2A, 2B, 2C, and 2D are diagrams that collectively illustrate an exemplary scenario of a change in a length of the vehicle of FIG. 1, in accordance with an embodiment of the disclosure.
Figure 2B:
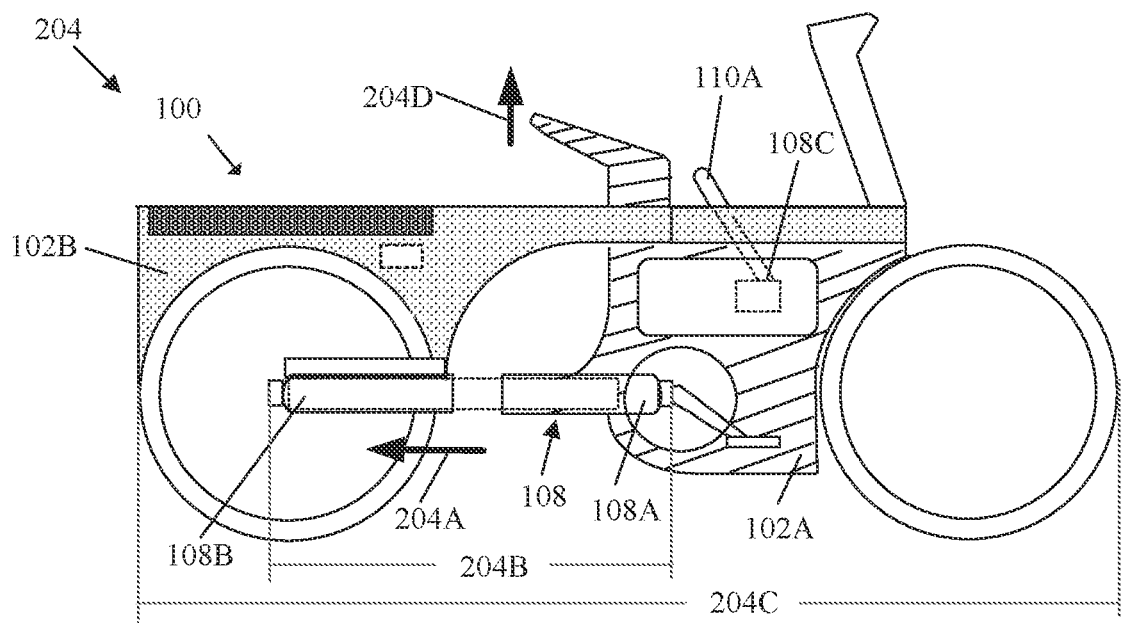

FIGS. 2A, 2B, 2C, and 2D are diagrams that collectively illustrate an exemplary scenario to cause a change in a length of the vehicle of FIG. 1, in accordance with an embodiment of the disclosure. FIGS. 2A, 2B, 2C, and 2D are explained in conjunction with elements from FIG. 1. With reference to FIGS. 2A and 2B, there is shown a sequence of operations that may be performed on the vehicle 100. The sequence of operations may include a first actuation operation 202, an extension operation 204, a second actuation operation 206, and a retraction operation 208.

With reference to FIG. 2A, there is shown the first actuation operation 202. In the first actuation operation 202, the locking member 110A may be actuated from a default position to an engaged position. For example, the locking member 110A may be pulled in a direction of a first motion 202A. In response to the pull, the locking member 110A may move from the default position to the engaged position, as shown in FIG. 2A. In an initial configuration of the vehicle 100, the extendable drive shaft 108 may be disposed at a first length 202B and the vehicle 100 may be disposed at a second length 202C. Based on the movement of the locking member 110A, the initial configuration of the vehicle 100 may change, as shown in FIG. 2B.

With reference to FIG. 2B, there is shown the extension operation 204. In the extension operation 204, the second part 102B may be moved along a first direction 204A (such as a direction opposed to a moving direction of the vehicle 100) and the movement of the second part 102B over the first part 102A may cause the change in the second length 202C of the vehicle 100 in the first direction 204A. For example, the biasing element of the locking mechanism 110 may control the movement of the second part 102B over the first part 102A, which may cause a change in the second length 202C of the vehicle 100 in the first direction 204A. Alternatively, in the extension operation 204, the second member 108B of the extendable drive shaft 108 may be moved along the first direction 204A and the movement of the second member 108B away from the first member 108A may cause the change in the first length 202B of the extendable drive shaft 108. The change may further cause the second part 102B to move over the first part 102A. The movement of the second part 102B may correspond to a change in the second length 202C of the vehicle 100 in the first direction 204A. For example, the first actuator 108C may apply the force on the second member 108B of the extendable drive shaft 108, to control the movement of the second member 108B away from the first member 108A. The application of the force may cause a change in the length (such as a change from the first length 202B to a third length 204B) of the extendable drive shaft 108, which may further cause the second part 102B to move over the first part 102A. The movement of the second part 102B away from the first part 102A may cause the change in the length (such as a change from the second length 202C to a fourth length 204C) of the vehicle 100 in the first direction 204A.

In an embodiment, the saddle 116 may be configured to vertically extend from the first part 102A of the body 102 in a direction 204D, which may be substantially perpendicular to the first direction 204A of the vehicle 100. For example, the third actuator associated with the saddle 116 may retractably extend the saddle 116 from the first part 102A of the body 102 in a direction 204D, which may be substantially perpendicular to the first direction 204A of the vehicle 100.

Figure 2C:
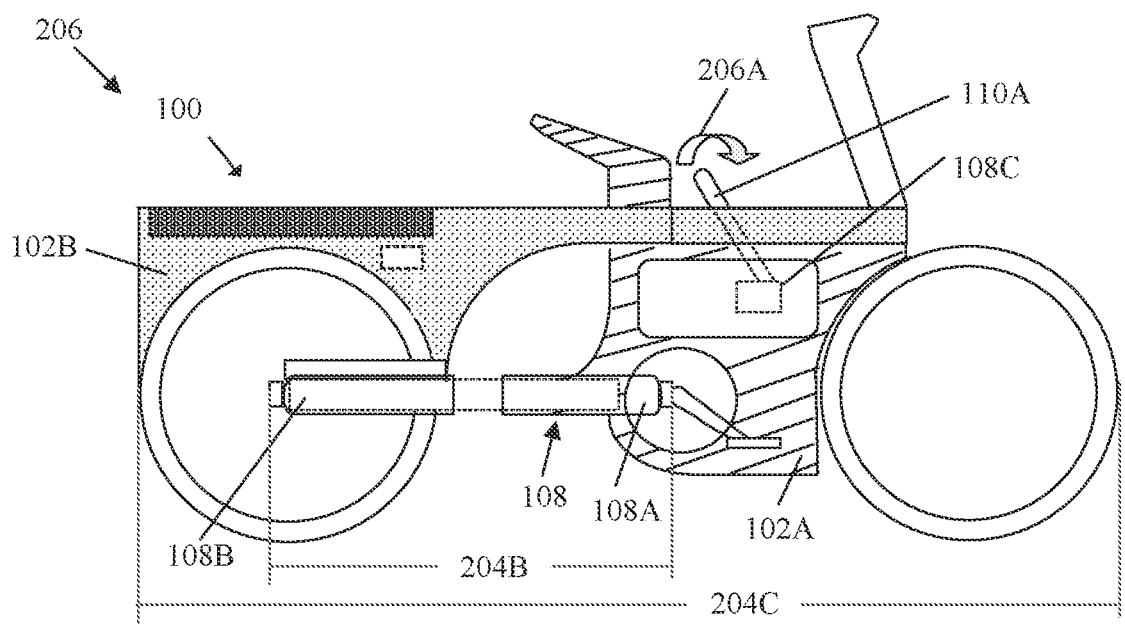

With reference to FIG. 2C, there is shown the second actuation operation 206. In the second actuation operation 206, the locking member 110A may be moved from the engaged position to the default position. As shown, for example, the locking member 110A may be pushed in a direction of a second motion 206A to move the locking member 110A from the engaged position to the default position. Based on the movement of the locking member 110A from the engaged position to the default position, there may be a change in a length (as described in FIG. 2D) of the vehicle 100.

Figure 2D:
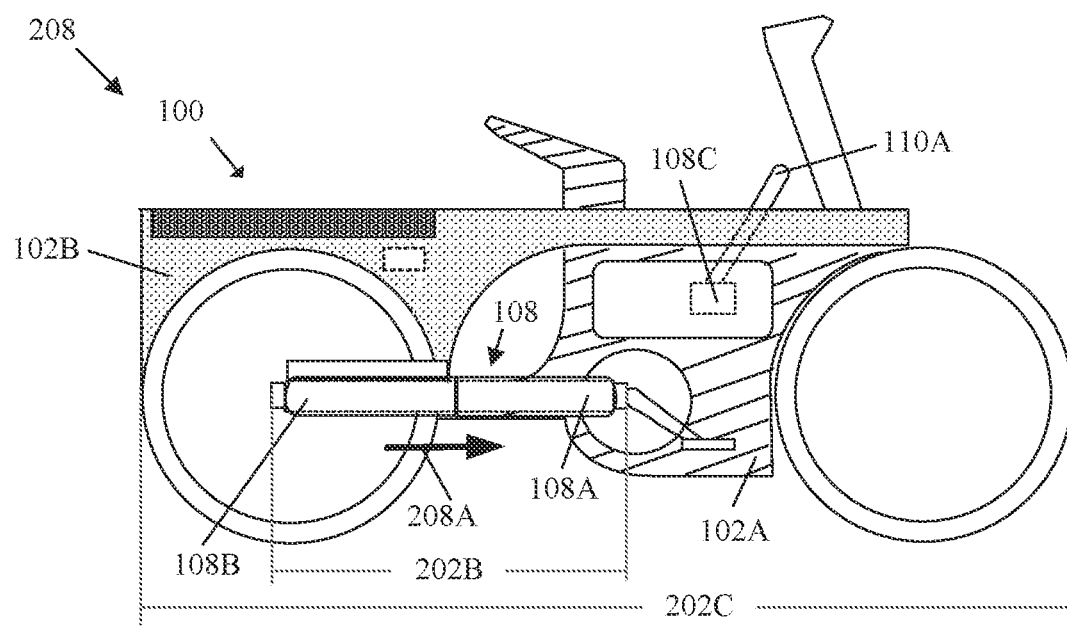

With reference to FIG. 2D, there is shown the retraction operation 208. In the retraction operation, the second part 102B may be moved along a second direction 208A and the movement of the second part 102B over the first part 102A may cause the change in the length (such as from the fourth length 204C to the second length 202C) of the vehicle 100. For example, the biasing element of the locking mechanism 110 may control the movement of the second part 102B over the first part 102A, which may cause the change in the length (such as from the fourth length 204C to the second length 202C) of the vehicle 100 along the second direction 208A, to retract the vehicle 100. Alternatively, in the retraction operation 208, the second member 108B of the extendable drive shaft 108 may be moved along the second direction 208A and the movement of the second member 108B towards the first member 108A may cause a change in the length (such as from the third length 204B to the first length 202B) of the extendable drive shaft 108, which may further cause the second part 102B to move over the first part 102A. The movement of the second part 102B from the first part 102A may cause a change in the length (such as from the fourth length 204C to the second length 202C) of the vehicle 100 along the second direction 208A, to retract the vehicle 100. For example, the first actuator 108C may apply the force on the second member 108B of the extendable drive shaft 108, to control the movement of the second member 108B towards the first member 108A, such that, the application of the force may cause the change in the length (such as from the third length 204B to the first length 202B) of the extendable drive shaft 108, which may further cause the second part 102B to move over the first part 102A. The movement of the second part 102B towards the first part 102A may cause the change in the length (such as from the fourth length 204C to the second length 202C) of the vehicle 100 in the second direction 208A, to retract the vehicle 100.

The operations in FIGS. 2A, 2B, 2C, and 2D are illustrated as discrete operations, such as 202, 204, 206, and 208. However, in certain embodiments, such discrete operations may be further divided into additional operations, combined into fewer operations, eliminated, or rearranged depending on the implementation without detracting from the essence of the disclosed embodiments.

FIG. 3 is a diagram that illustrates an electronically controlled exemplary vehicle, in accordance with an embodiment of the disclosure. FIG. 3 is explained in conjunction with elements from FIG. 1 and FIGS. 2A, 2B, 2C, and 2D. With reference to FIG. 3, there is shown a vehicle 300. The vehicle 300 may include components such as a body, a pedal assembly, a wheel assembly, an extendable drive shaft, a locking mechanism, a footrest dock, a footrest adjustment mechanism, and a saddle, which may be substantially same as the components such as the body 102, the pedal assembly 104, the wheel assembly 106, the extendable drive shaft 108, the locking mechanism 110, the footrest dock 112, the footrest adjustment mechanism 114, and the saddle 116 of the vehicle 100. Details of such components of the vehicle 300 are omitted from the disclosure for the sake of brevity. With reference to FIG. 3, the vehicle 300 may include an electronic controller 302. The electronic controller 302 may be configured to acquire information related to the vehicle 300 from a sensor 304 associated with the vehicle 300. The electronic controller 302 may be further configured to control an operator device 306 and an electronic trigger unit 308, based on the acquired information.

The electronic controller 302 may include suitable logic, circuitry, interfaces, and/or code that may be configured to control the locking mechanism 110 and unlock the second part 102B from the first part 102A by moving the locking member 110A in the unlocked position. The electronic controller 302 may be a specialized electronic circuitry that may include an electronic control unit (ECU) processor to control different functions, such as, but not limited to, engine operations, communication operations, and data acquisition of the vehicle 300.

In an embodiment, the electronic controller 302 may be a microprocessor. Other examples of the electronic controller 302 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. In another embodiment, the electronic controller 302 may be included or integrated in the vehicle 300 and configured to acquire information associated with the vehicle 300 from the sensor 304.

The sensor 304 may include suitable logic, circuitry, and interfaces that may be configured to detect information related to a load on the vehicle 300. Examples of the sensor 304 may include, but are not limited to, a strain gauge, a load cell, and a piezo-electric transducer. In an embodiment, the sensor 304 may be disposed on a saddle (such as the saddle 116) of the vehicle 300. When the occupant sits on the saddle 116 of the vehicle 300, the sensor 304 may detect a load/force that may act on the sensor 304 and may convert the received load/force into electrical signals, which may be transmitted to the electronic controller 302.

Figure 4A:
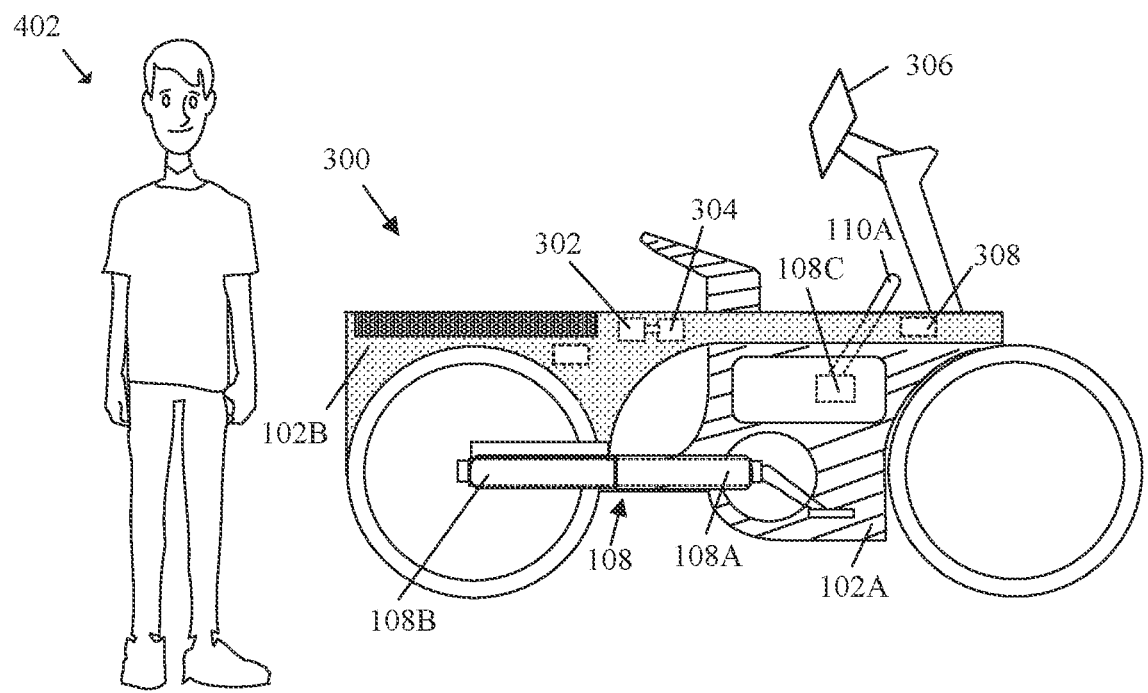
FIGS. 4A, 4B, 4C, 4D, and 4E are diagrams that illustrate exemplary scenarios to determine a state of the vehicle of FIG. 3, in accordance with an embodiment of the disclosure.
Figure 4B:
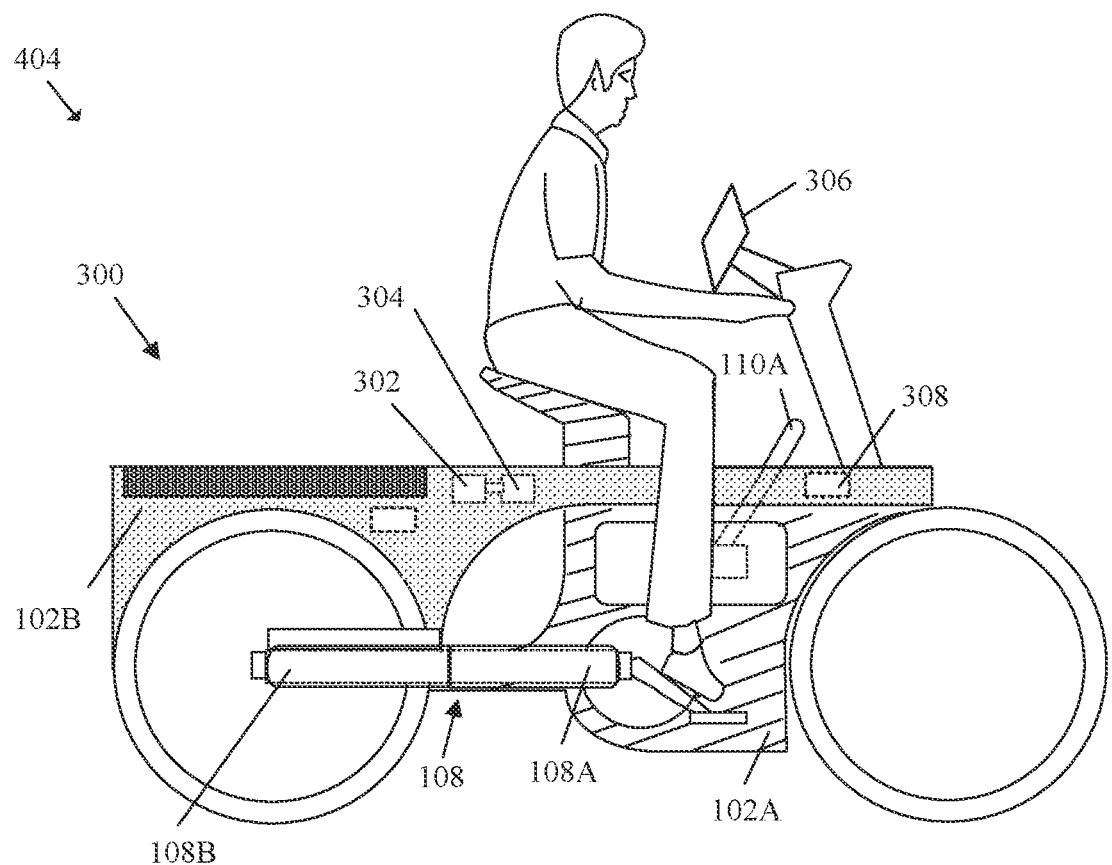
Figure 4C:
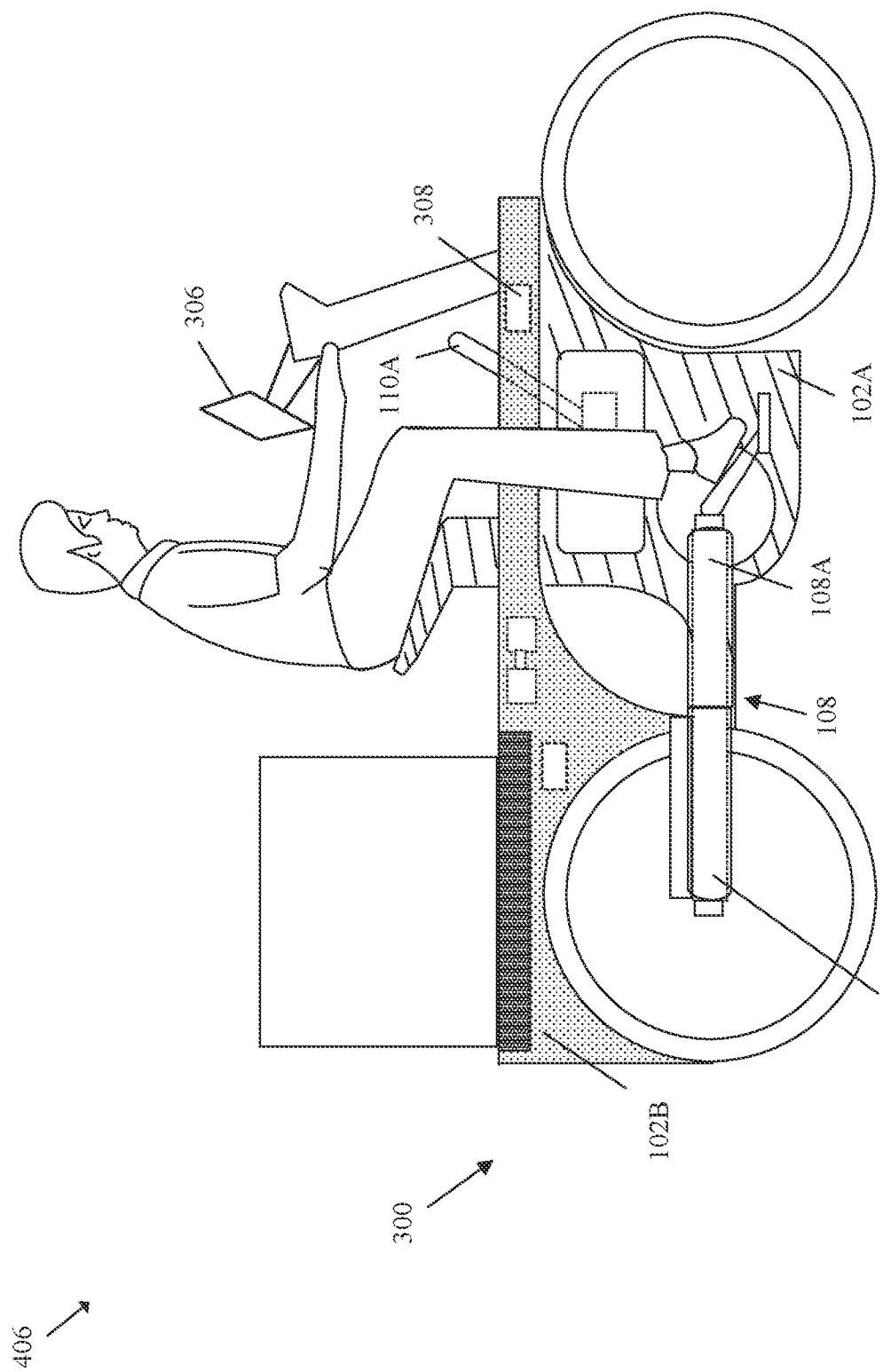
Figure 4D:
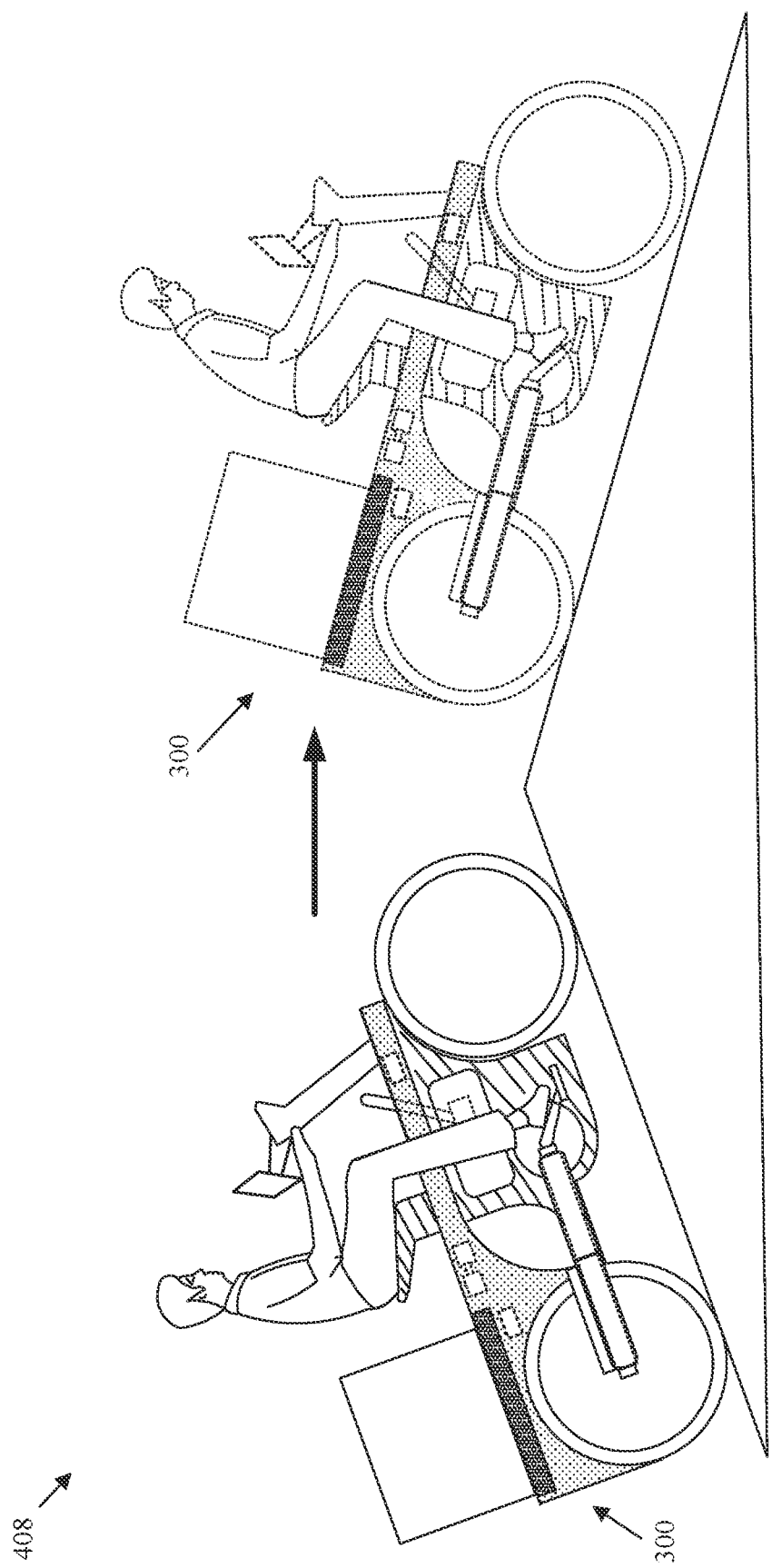

In another embodiment, the sensor 304 may include suitable logic, circuitry, and interfaces that may be configured to detect information related to a relative inclination of the vehicle 300 with a surface reference (as shown in FIG. 4D). Examples of the sensor 304 may include, but are not limited to, a tilt sensor and a gyro sensor. In an embodiment, the sensor 304 may be disposed on a part (such as the first part 102A or the second part 102B) of the vehicle 300. When the occupant commutes with the vehicle 300 on an inclined surface, the sensor 304 may detect a change in an inclination of the vehicle 300 from the reference surface and may convert the detected change into electrical signals, which may be transmitted to the electronic controller 302. Based on the received signals, the electronic controller 302 may control the operator device 306 on the vehicle 300 to display an option to unlock the second part 102B from the first part 102A.

The operator device 306 may include suitable logic, circuitry, and/or interfaces that may be configured to host an application with a graphical user interface to display an option to unlock the second part 102B from the first part 102A. In an embodiment, the application may be downloaded to the operator device 306 from a server. Examples of the operator device 306 may include, but are not limited to, a computing device, a smartphone, a cellular phone, a mobile phone, a tablet computer, and other portable devices. The electronic controller 302 may be configured to receive a user input comprising a selection of the displayed option on the operator device 306. Based on the selection of the displayed option, the electronic controller 302 may control the electronic trigger unit 308 to control the locking mechanism 110 and to unlock the second part 102B from the first part 102A by moving the locking member 110A in the unlocked position.

The electronic trigger unit 308 may include suitable logic, circuitry, and/or interfaces that may be configured to unlock the second part 102B from the first part 102A by moving the locking member 110A in the unlocked position. In an embodiment, the electronic trigger unit 308 may be integrated into the locking mechanism 110 and may be coupled between the first part 102A and the second part 102B. Based on a control by the electronic controller 302, the electronic trigger unit 308 may be configured to control the movement of the second part 102B, to retractably couple the second part 102B with the first part 102A. Examples of the electronic trigger unit 308 may include, but are not limited to, an electromagnetic latch and a solenoid.

In operation, the electronic controller 302 may acquire information related to at least one of: the load on the vehicle 300 or the relative inclination of the vehicle 300 with the surface reference (as shown in FIG. 4D). The information may be acquired from the sensor 304 associated with the vehicle 300. Based on the acquired information, the electronic controller 302 may determine a state (for example, a loaded state, an inclined state, and the like) of the vehicle 300 based on the acquired information. Details of the state of the vehicle 300 are further described, for example, in FIGS. 4A-4E. Based on the determined state, the electronic controller 302 may control the operator device 306 to display the option to unlock the second part 102B from the first part 102A. For example, the option may be displayed in the form of at least two graphical user interface buttons, such as a first button and a second button on the display of the operator device 306. The first button may be displayed with text, "ACCEPT" and the second button may be displayed with text, "CANCEL". If the occupant selects the second button, the operator device 306 may discard the displayed option. Whereas, if the occupant selects the first button, the operator device 306 may transmit the user input to the electronic controller 302 for further operations, as described herein.

The electronic controller 302 may receive the user input comprising the selection of the displayed option from the operator device 306. Based on the selection of the displayed option, the electronic controller 302 may further control the electronic trigger unit 308 that may be integrated into the locking mechanism to unlock the second part 102B from the first part 102A by moving the locking member 110A in the unlocked position.

In certain cases, a child occupant may be seated on the vehicle 300. In such cases, it may be difficult for the child occupant to rest his/her respective foot portions on the footrest dock (such as the footrest dock 112) located on the vehicle 300. To help the child occupants, the electronic controller 302 may control the second actuator (such as the second actuator 114A) to adjust a position of the footrest dock 112 with respect to a base of the vehicle 300. For example, the electronic controller 302 may control the second actuator 114A to apply a force on the footrest dock 112. The application of the force may cause a change in the position of the footrest dock 112 so as to match a position of the respective foot portions of the child occupant.

FIGS. 4A-4E are diagrams that illustrate exemplary scenarios to determine a state of the vehicle of FIG. 3, in accordance with an embodiment of the disclosure. FIG. 4 is explained in conjunction with elements from FIG. 1, FIGS. 2A-2B, and FIG. 3. With reference to FIGS. 4A-4E, there is shown a set of different states of the vehicle 300. The different states may include an unloaded state 402, a first loaded state 404, a second loaded state 406, an inclined state 408, and a moving state 410.

With reference to FIG. 4A, there is shown the unloaded state 402. In certain cases (such as while commuting in traffic locations or while parking the vehicle 300), the occupant may walk along with the vehicle 300. In such cases, the vehicle 300 may be started and moved at a moderate speed such that the moderate speed matches with a gait speed (or a walking speed) of the occupant.

Based on the unloaded state of the vehicle 300 detected by the sensor 304, the electronic controller 302 may control the operator device 306 on the vehicle 300 to display the option to retract the second part 102B towards the first part 102A. Based on the selection of the displayed option, the electronic controller 302 may further control the electronic trigger unit 308 to retract the second part 102B towards the first part 102A.

With reference to FIG. 4B, there is shown the first loaded state 404. In the first loaded state 404, the occupant may be seated on the vehicle 300 and may be travelling to a destination. Based on the first loaded state of the vehicle 300 detected by the sensor 304, the electronic controller 302 may control the operator device 306 to display the option to retract the second part 102B towards the first part 102A. Based on the selection of the displayed option, the electronic controller 302 may further control the electronic trigger unit 308 to retract the second part 102B towards the first part 102A.

With reference to FIG. 4C, there is shown the second loaded state 406. In certain cases, there may be several occupants and/or cargo on the vehicle 300. For example, there may be a primary occupant (such as a driver) to drive the vehicle 300. In addition to the primary occupant, there may be a plurality of secondary occupants (who may be passengers) and/or cargo on the vehicle 300. Based on the second loaded state of the vehicle 300 detected by the sensor 304, the electronic controller 302 may control the operator device 306 to display the option to extend the second part 102B from the first part 102A. Based on the selection of the displayed option, the electronic controller 302 may further control the electronic trigger unit 308 to extend the second part 102B from the first part 102A, which causes the second member 108B of the extendable drive shaft 108 to extend from the first member 108A of the extendable drive shaft 108. The extension may provide additional torque to pedal the vehicle 300. With the additional torque, the vehicle 300 may carry all the occupants and/or cargo, without a need to increase the pedaling speed of the vehicle 300.

With reference to FIG. 4D, there is shown the inclined state 408. In certain cases, the vehicle 300 may move uphill or downhill. In case the vehicle 300 is moving uphill, there may be a requirement of an additional torque in the vehicle 300 to climb on the uphill. In an embodiment, the sensor 304 may detect an uphill movement of the vehicle 300 and may transmit the detected signals to the electronic controller 302. The electronic controller 302 may control the operator device 306 on the vehicle 300 to display the option to extend the second part 102B from the first part 102A. Based on the selection of the displayed option, the electronic controller 302 may further control the electronic trigger unit 308 to extend the second part 102B from the first part 102A, which causes the second member 108B of the extendable drive shaft 108 to extend from the first member 108A of the extendable drive shaft 108. The extension may provide additional torque to easily climb up on the uphill.

In case the vehicle 300 moves downhill, there may be a requirement of an additional speed in the vehicle 300 to quickly move on the downhill. In an embodiment, the sensor 304 may detect the downhill movement of the vehicle 300 and may transmit the detected signals to the electronic controller 302. The electronic controller 302 may control the operator device 306 on the vehicle 300 to display the option to retract the second part 102B towards the first part 102A. Based on the selection of the displayed option, the electronic controller 302 may further control the electronic trigger unit 308 to retract the second part 102B towards the first part 102A, to improve a speed of the vehicle 300.

Figure 4E:
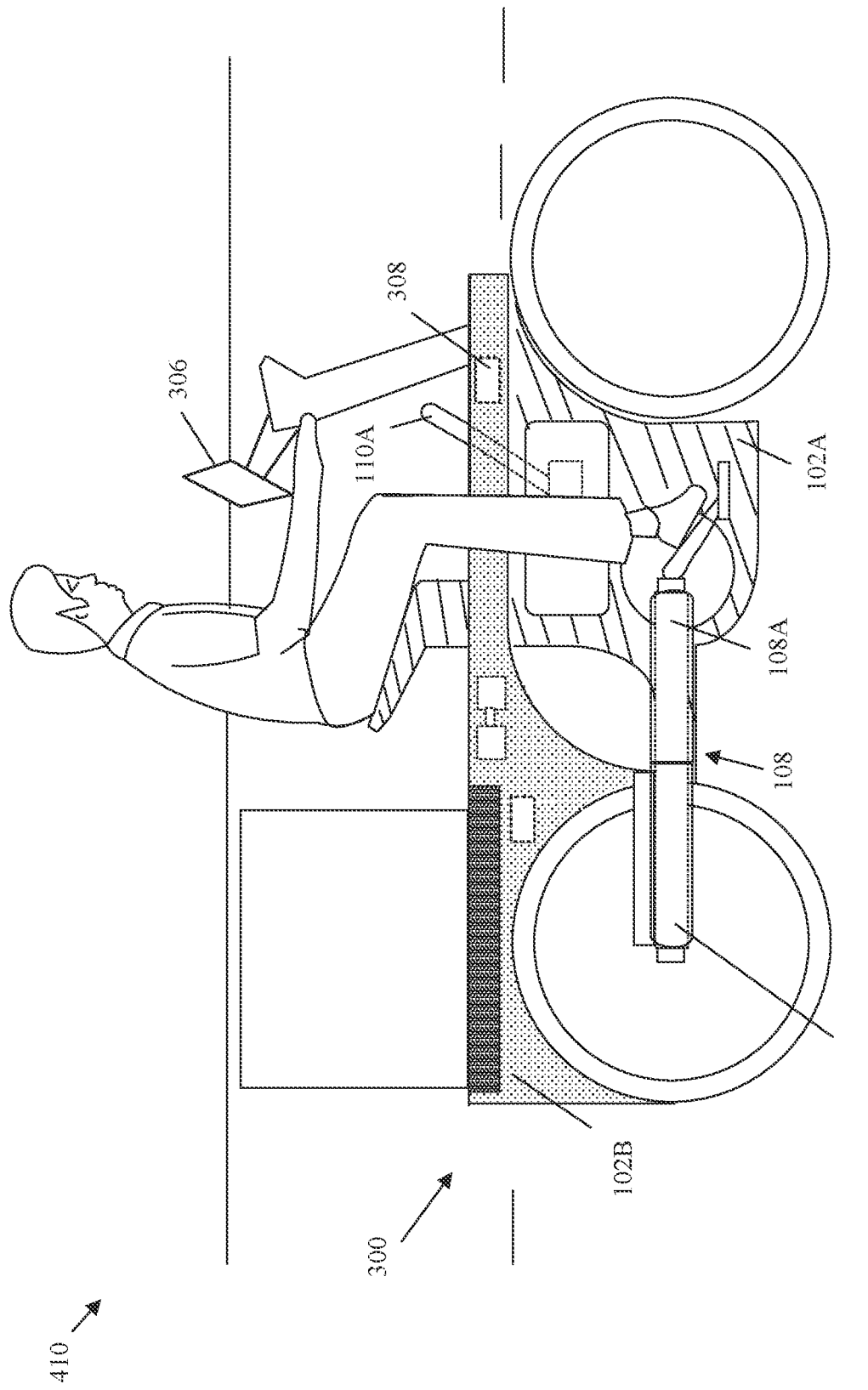

With reference to FIG. 4E, there is shown the moving state 410. The moving state 410 may correspond to a state in which the vehicle 300 is travelling on a road. In the moving state 410, the electronic controller 302 may control the locking mechanism 110 in such a way that the movement of the second part 102B away from the first part 102A doesn't impact a stability in the moving state 410. For example, in case of hairpin turns on road, the electronic controller 302 may control the operator device 306 on the vehicle 300 to display the option to retract the second part 102B towards the first part 102A. Based on the selection of the displayed option, the electronic controller 302 may further control the electronic trigger unit 308 to retract the second part 102B towards the first part 102A, to improve a maneuverability of the vehicle 300. Based on the improved maneuverability, the vehicle 300 may have an improved stability in the moving state.

In an embodiment, the sensor 304 may also detect a rest state of the vehicle 300. The rest state may correspond to a static position of the vehicle 300. In the rest state, the electronic controller 302 may control the operator device 306 on the vehicle 300 to display the option to retract the second part 102B towards the first part 102A. Based on the selection of the displayed option, the electronic controller 302 may further control the electronic trigger unit 308 to retract the second part 102B towards the first part 102A. This may help to park the vehicle 300 in a limited parking space.

The different states described in FIGS. 4A-4E are illustrated as discrete states, such as 402, 404, 406, 408, and 410. However, in certain embodiments, such discrete states may be further divided into additional states, combined into fewer states, eliminated, or rearranged depending on the implementation without detracting from the essence of the disclosed embodiments.

FIG. 5 is a flowchart that illustrates an exemplary method to operate the vehicle of FIG. 1, in accordance with an embodiment of the disclosure. FIG. 5 is explained in conjunction with elements from FIGS. 1, 2A-2B, 3, and 4A-4E. With reference to FIG. 5, there is shown a flowchart 500 that depicts a method to operate the vehicle 100 of FIG. 1. The method illustrated in the flowchart 500 may start from 502.

At 502, the vehicle 100 may be disposed. The vehicle 100 may include the body 102 having the first part 102A, the second part 102B, and the extendable drive shaft 108 moveably coupled between first part 102A and second part 102B of body 102. In an embodiment, the occupant may dispose the vehicle 100 on the road, as described, for example, in FIG. 1, and FIGS. 2A-2D.

At 504, the locking member 110A may be moved in the unlocked position to unlock the second part 102B from first part 102A. The locking member 110A may be coupled to the first part 102A and the second part 102B of the body 102. In an embodiment, the occupant may move locking member 110A in the unlocked position, as described, for example, in FIG. 1, and FIGS. 2A-2D.

At 506, the second part 102*b* may be allowed to move over first part 102A. The movement of second part 102B may cause a change in the length of extendable drive shaft 108. In an embodiment, the movement of the locking member 110A in the unlocked position may allow the second part 102*b* to move over the first part 102A, as described, for example, in FIG. 1, and FIGS. 2A-2D.

The flowchart 500 is illustrated as discrete operations, such as 502, 504, and 506. However, in certain embodiments, such discrete operations may be further divided into additional operations, combined into fewer operations, or eliminated, or rearranged depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A vehicle, comprising:
a body comprising a first part and a second part, wherein the second part is moveably coupled to the first part;
a pedal assembly comprising a first component, wherein the first component is coupled to the first part;
a wheel assembly comprising a second component, wherein the second component is coupled to the second part;
an extendable drive shaft comprising a first member and a second member, wherein the first member is coupled to the first component and the second member is coupled to the second component;
a locking mechanism comprising a locking member coupled to the first part and the second part of the body, and
wherein the locking member, in an unlocked position, unlocks the second part from the first part, which allows the second part to move over the first part, and the movement of the second part causes a change in a length of the extendable drive shaft,
a first actuator coupled to the extendable drive shaft, wherein, after the locking member is in an unlocked position, the first actuator is controlled to apply a force on the extendable drive shaft, and
the application of the force causes the change in the length of the extendable drive shaft, which further causes the second part to move over the first part.

2. The vehicle according to claim 1, wherein the change in the length of the extendable drive shaft and the movement of the second part over the first part causes a change in a length of the vehicle in a first direction.

3. The vehicle according to claim 1, wherein the locking member, in a locked position, locks the second part to the first part.

4. The vehicle according to claim 1, wherein the first part is a frame of the vehicle and the second part is an extendable cargo portion that rests on the frame.

5. The vehicle according to claim 1, wherein the first part is an enclosure that includes a component space to hold a battery and the pedal assembly of the vehicle.

6. The vehicle according to claim 1, wherein the change in the length of the extendable drive shaft corresponds to an extension or a contraction of the second member telescopically from the first member.

7. The vehicle according to claim 1, wherein the movement of the second part over the first part causes a change in a length of the vehicle in a first direction.

8. The vehicle according to claim 1, further comprising a saddle which vertically extends from the first part of the body in a direction which is substantially perpendicular to a first direction of the vehicle.

9. The vehicle according to claim 1, further comprising a footrest dock coupled to the second part of the body.

10. The vehicle according to claim 1, further comprising an electronic controller which:
acquires, from a sensor associated with the vehicle, information related to at least one of:
a load on the vehicle or a relative inclination of the vehicle with a surface reference;
determines a state of the vehicle based on the acquired information;
controls, based on the determined state, an operator device on the vehicle to display an option to unlock the second part from the first part;
receives a user input comprising a selection of the displayed option; and
controls, based on the selection of the displayed option, an electronic trigger unit integrated into the locking mechanism to unlock the second part from the first part by moving the locking member in the unlocked position.

11. The vehicle according to claim 10, further comprising:
a footrest dock located on a base of the vehicle; and
a footrest adjustment mechanism comprising a second actuator coupled to the footrest dock,
wherein the electronic controller further controls the second actuator to adjust a position of the footrest dock with respect to the base.

12. The vehicle according to claim 10, wherein the state comprises at least one of:
an unloaded state,
a first loaded state in which the vehicle is loaded with only a weight of a rider,
a second loaded state in which the vehicle is loaded with the weight of the rider and weights of one or more passengers or a cargo nest on a rear seating section of the second part of the body,
an inclined state in which the vehicle is inclined at an angle on an uphill location or a downhill location,
a moving state in which the vehicle is in a motion, and
a rest state in which the vehicle is not in the motion.

13. A vehicle, comprising:
a body comprising a first part and a second part, wherein the second part is moveably coupled to the first part;
a saddle which vertically extends from the first part of the body in a direction which is substantially perpendicular to a first direction of the vehicle;
a pedal assembly comprising a first component, wherein the first component is coupled to the first part;
a wheel assembly comprising a second component, wherein the second component is coupled to the second part;
an extendable drive shaft comprising a first member and a second member, wherein the first member is coupled to the first component and the second member is coupled to the second component;
a locking mechanism comprising a locking member coupled to the first part and the second part of the body, and
a first actuator coupled to the extendable drive shaft, wherein, after the locking member is in an unlocked position, the first actuator is controlled to apply a force on the extendable drive shaft, and
the application of the force causes the change in the length of the extendable drive shaft, which further causes the second part to move over the first part.

14. The vehicle according to claim 13, wherein the first part is a frame of the vehicle and the second part is an extendable cargo portion that rests on the frame.

15. The vehicle according to claim 13, wherein the first part is an enclosure that include a component space to hold a battery and the pedal assembly of the vehicle.

16. The vehicle according to claim 13, wherein the locking member, in an unlocked position, unlocks the second part from the first part, which allows the second part to move over the first part, and the movement of the second part causes a change in a length of the extendable drive shaft.

17. The vehicle according to claim 13, further comprising a footrest dock coupled to the second part of the body.

18. The vehicle according to claim 13, further comprising:
   a footrest dock located on a base of the vehicle; and
   a footrest adjustment mechanism comprising a second actuator coupled to the footrest dock.

19. A vehicle, comprising:
   a body comprising a first part and a second part, wherein the second part is moveably coupled to the first part;
   a pedal assembly comprising a first component, wherein the first component is coupled to the first part, the first part is an enclosure that includes a component space to hold a battery and the pedal assembly;
   a wheel assembly comprising a second component, wherein the second component is coupled to the second part;
   an extendable drive shaft comprising a first member and a second member, wherein the first member is coupled to the first component and the second member is coupled to the second component;
   a locking mechanism comprising a locking member coupled to the first part and the second part of the body, and
      wherein the locking member, in an unlocked position, unlocks the second part from the first part, which allows the second part to move over the first part, and the movement of the second part causes a change in a length of the extendable drive shaft.

* * * * *